United States Patent [19]

Keefer

[11] 4,230,564
[45] Oct. 28, 1980

[54] ROTARY REVERSE OSMOSIS APPARATUS AND METHOD

[76] Inventor: Bowie G. Keefer, 4324 W. 11th Ave., Vancouver, British Columbia, Canada, V6R 2M1

[21] Appl. No.: 927,550

[22] Filed: Jul. 24, 1978

Related U.S. Application Data

[63] Continuation-in-part of Ser. No. 806,704, Jun. 15, 1977, abandoned.

[51] Int. Cl.² .................. B01D 31/00; B01D 13/00
[52] U.S. Cl. ........................... 210/652; 210/321 R; 210/433 M
[58] Field of Search ............ 210/23 H, 321 R, 433 M, 210/369, 354, 376

[56] References Cited

U.S. PATENT DOCUMENTS

| | | | |
|---|---|---|---|
| 3,355,382 | 11/1967 | Huntington | 210/22 |
| 3,400,074 | 9/1968 | Grenci | 210/23 H |
| 3,669,879 | 6/1972 | Berriman | 210/23 H |

FOREIGN PATENT DOCUMENTS 2007474  9/1970  Fed. Rep. of Germany ...... 210/321 R

*Primary Examiner*—Frank A. Spear, Jr.
*Attorney, Agent, or Firm*—Carver and Company

[57] ABSTRACT

Reverse osmosis or ultrafiltration apparatus having first and second rotors revolving in the same direction about a central axis. The first rotor revolves at a higher speed and has an impeller which serves as a feed pump for the feed fluid. The second rotor revolves at lower speed and has a pressure vessel containing semi-permeable membranes which selectively permeate one component of a feed fluid, and has an integral diffuser casing for the feed pump. This arrangement reduces disc friction and diffuser hydraulic losses compared to conventional centrifugal machinery with stationary casings. The membranes are arranged so that centrifuge action within the rotating membrane assembly inhibits fouling and concentration polarization by differential buoyancy effects. The impeller can be centrifugal type with an externally surrounding diffuser, or it can be in an external impeller type enclosing a pitot tube pump type diffuser. Some embodiments include a centripetal energy recovery turbine for the concentrate fluid rejected by the membranes, the turbine runner being mounted on the first rotor remote from, or integral with, the impeller. Alternatively concentrate fluid energy can be recovered by using tangentially disposed nozzles mounted on the second rotor to discharge fluid backwards. Permeate fluid energy can be recovered from permeate nozzles ejecting permeate fluid against an impulse turbine mounted on a third rotor journalled to rotate about the axis at a speed of about one-half of the speed of the second rotor.

27 Claims, 13 Drawing Figures

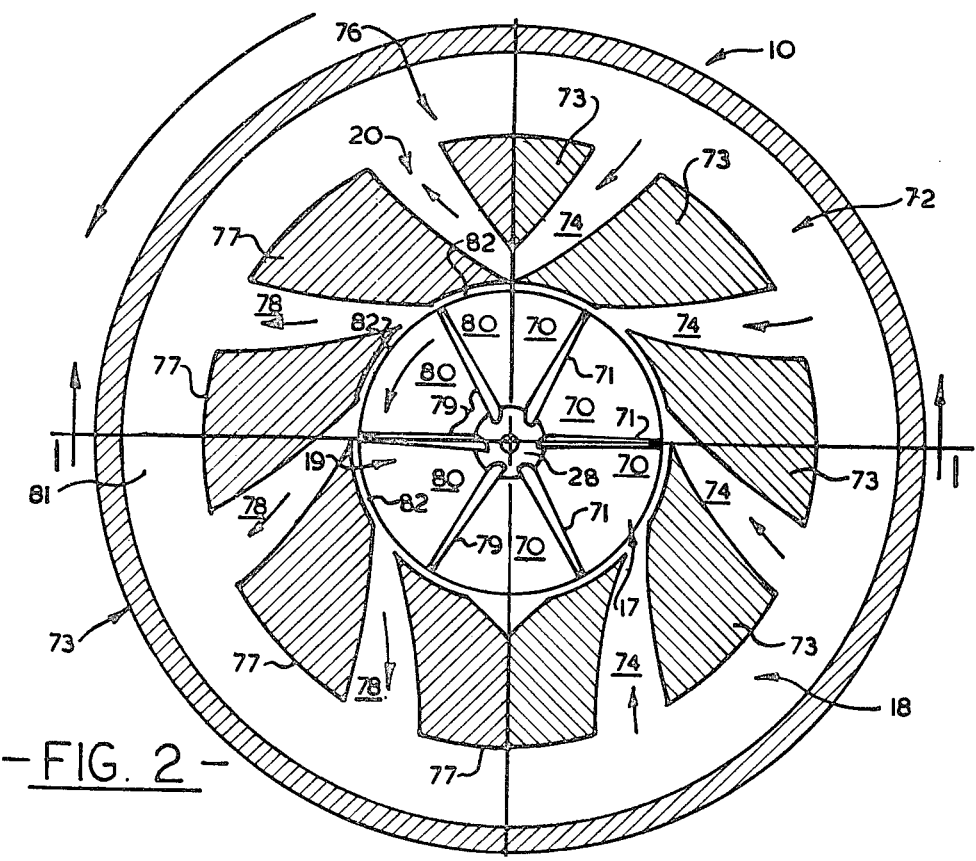
-FIG. 2-
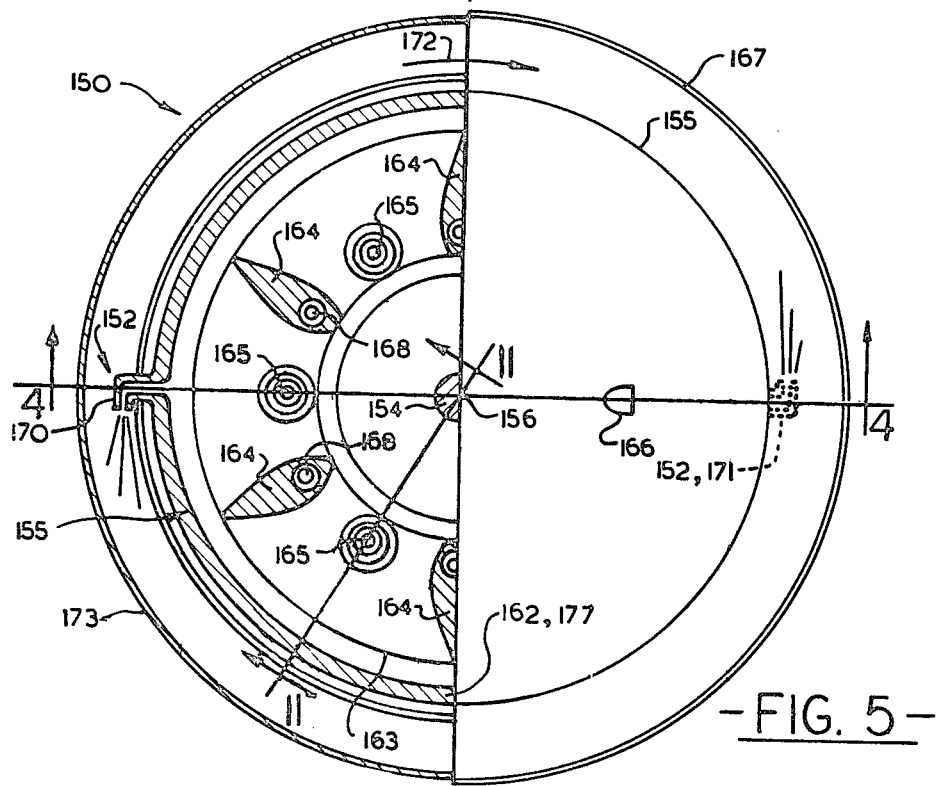
-FIG. 5-

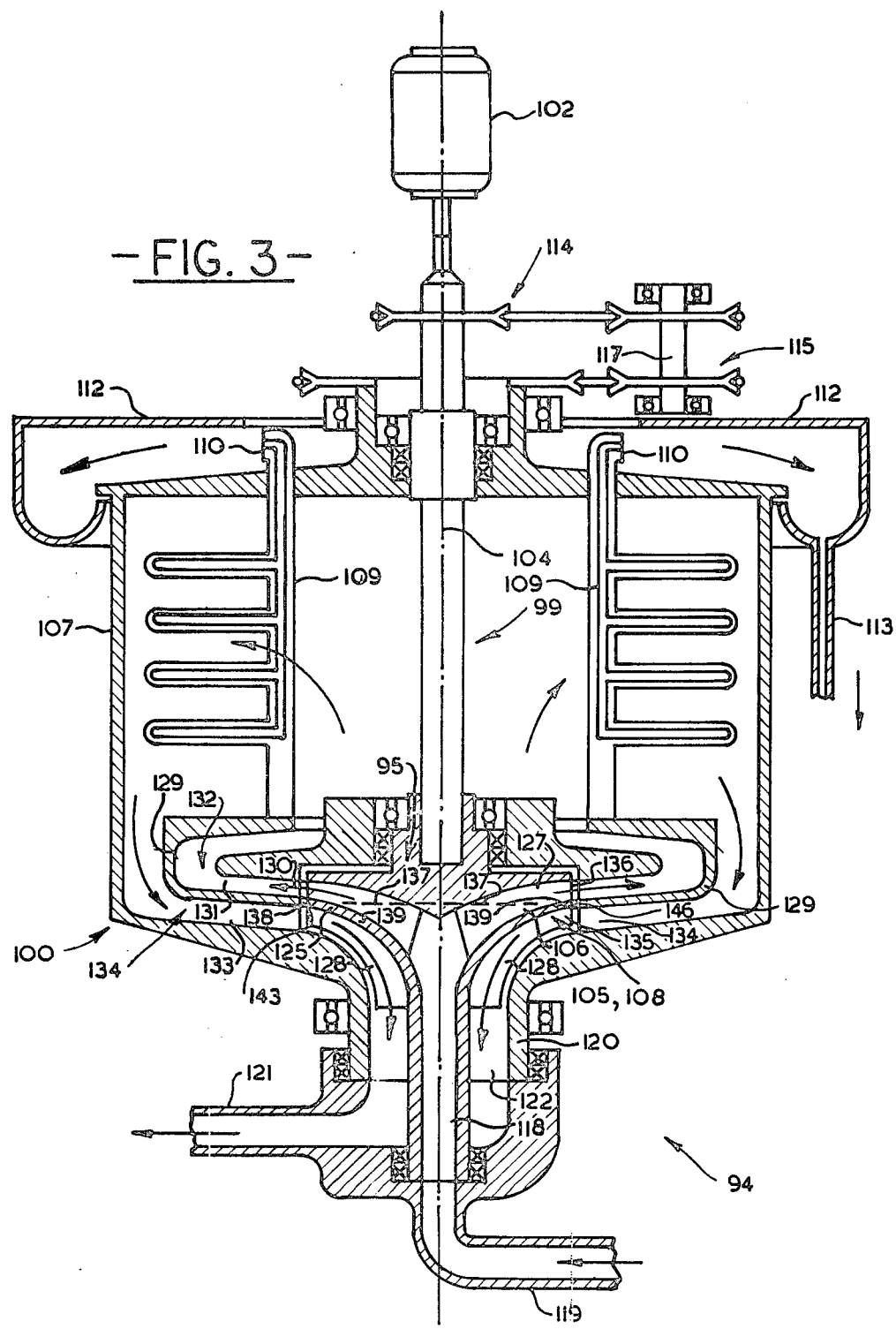

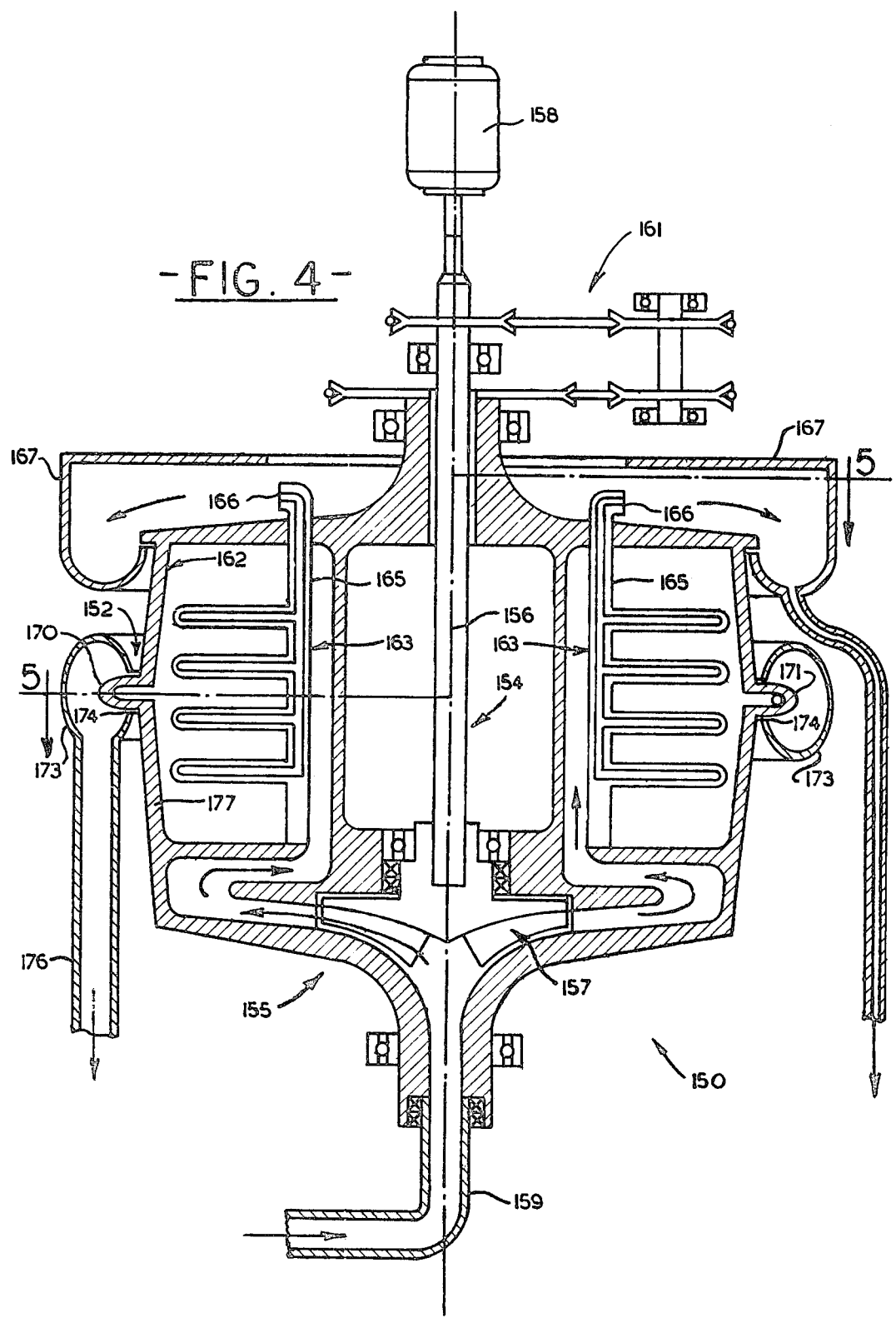

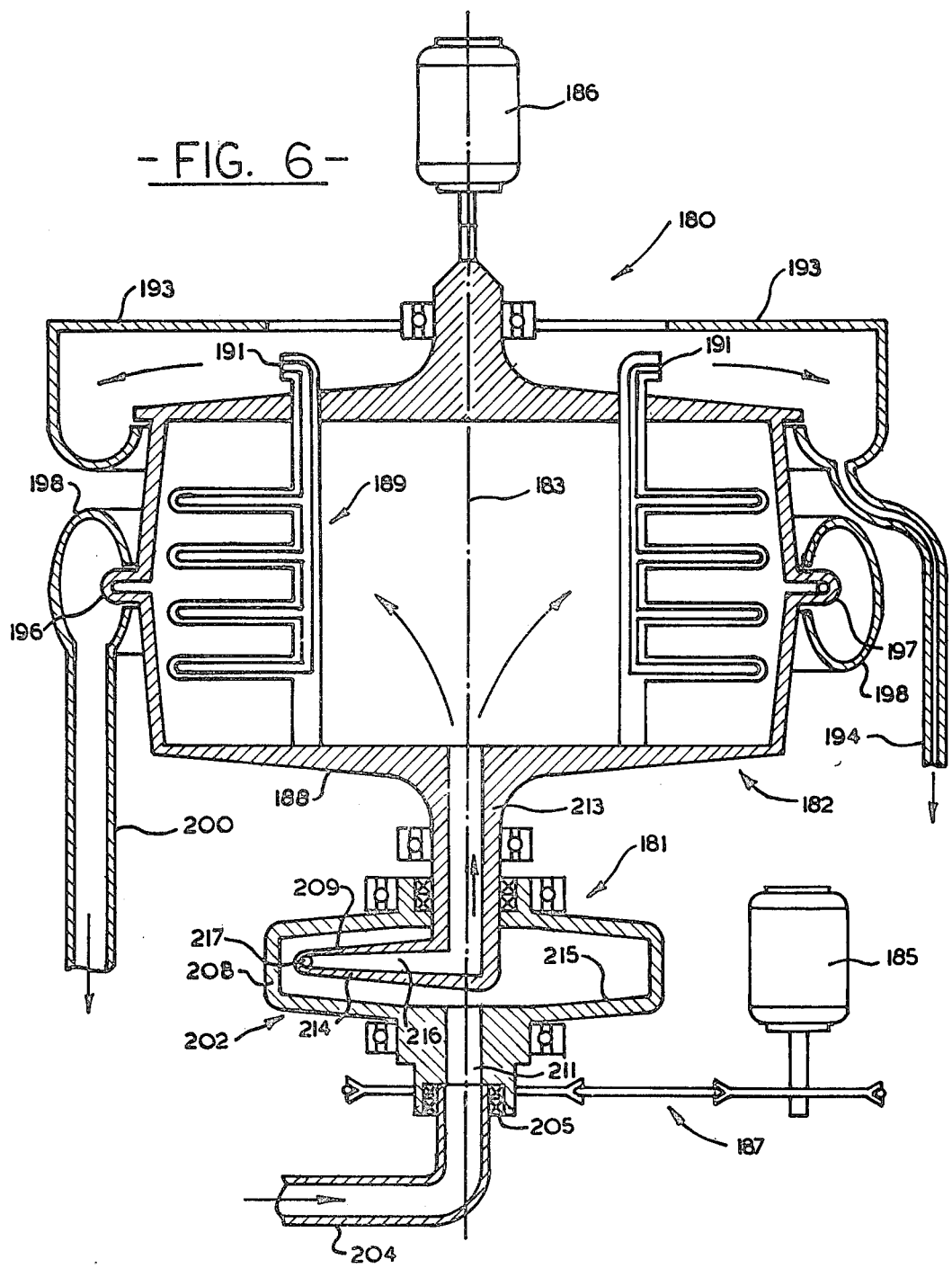

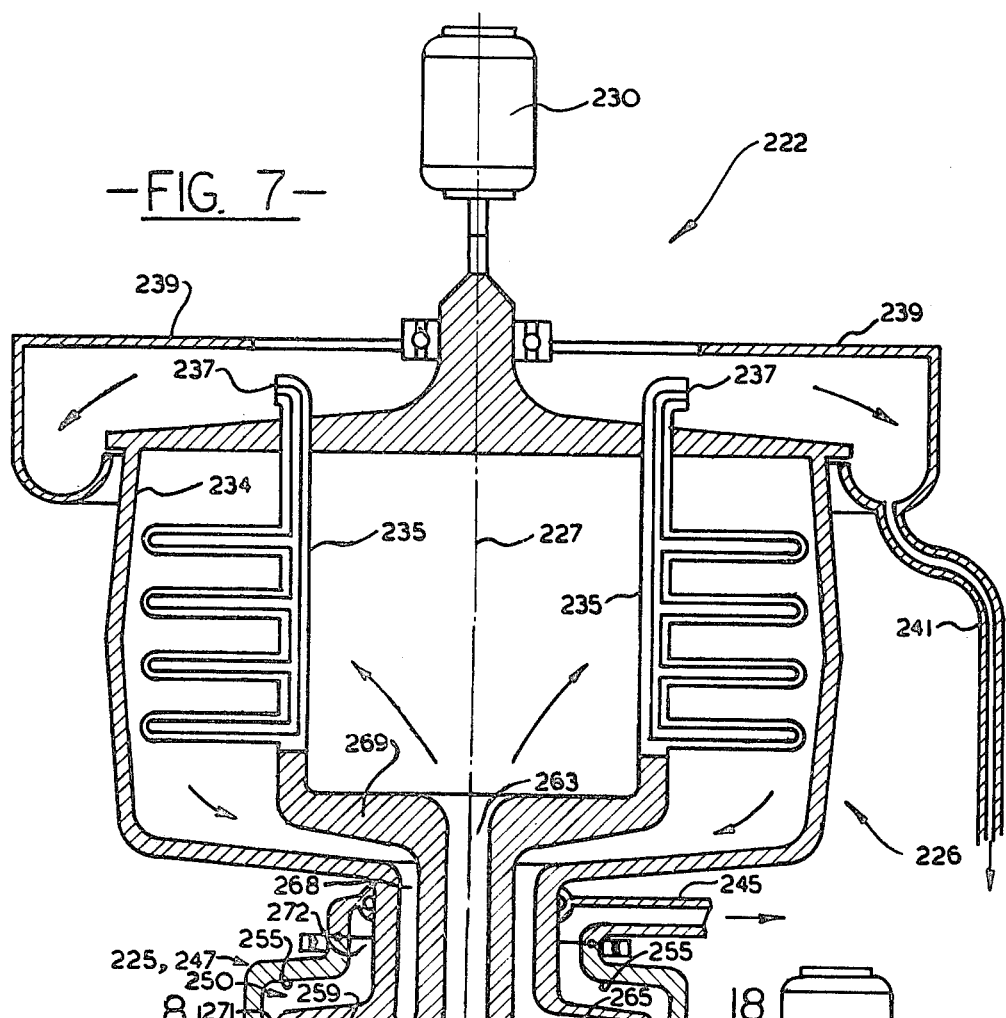
-FIG. 7-
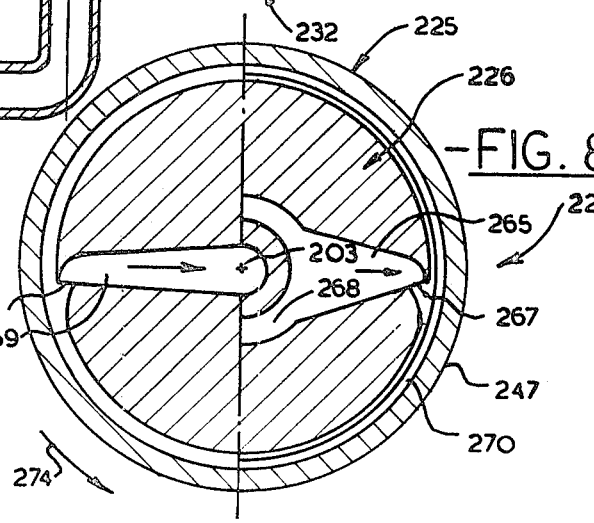
-FIG. 8-

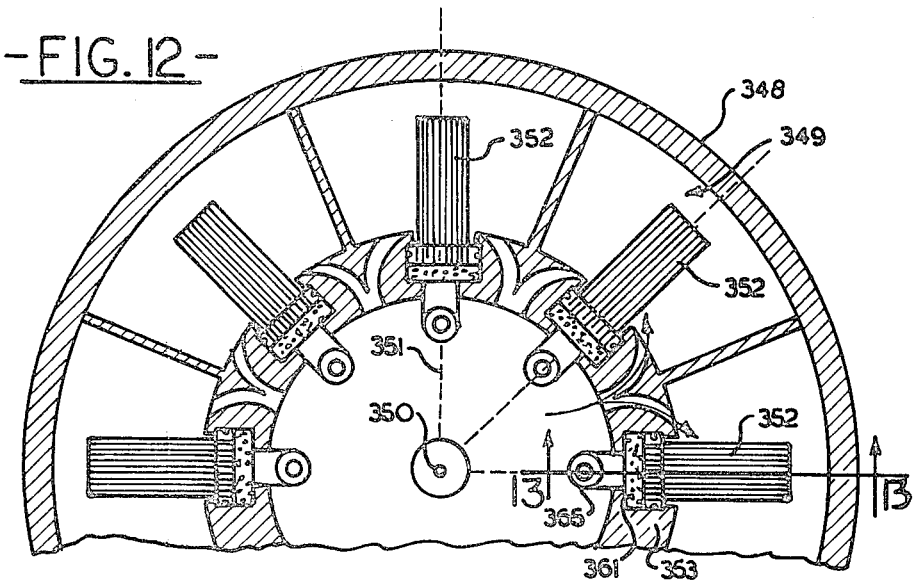
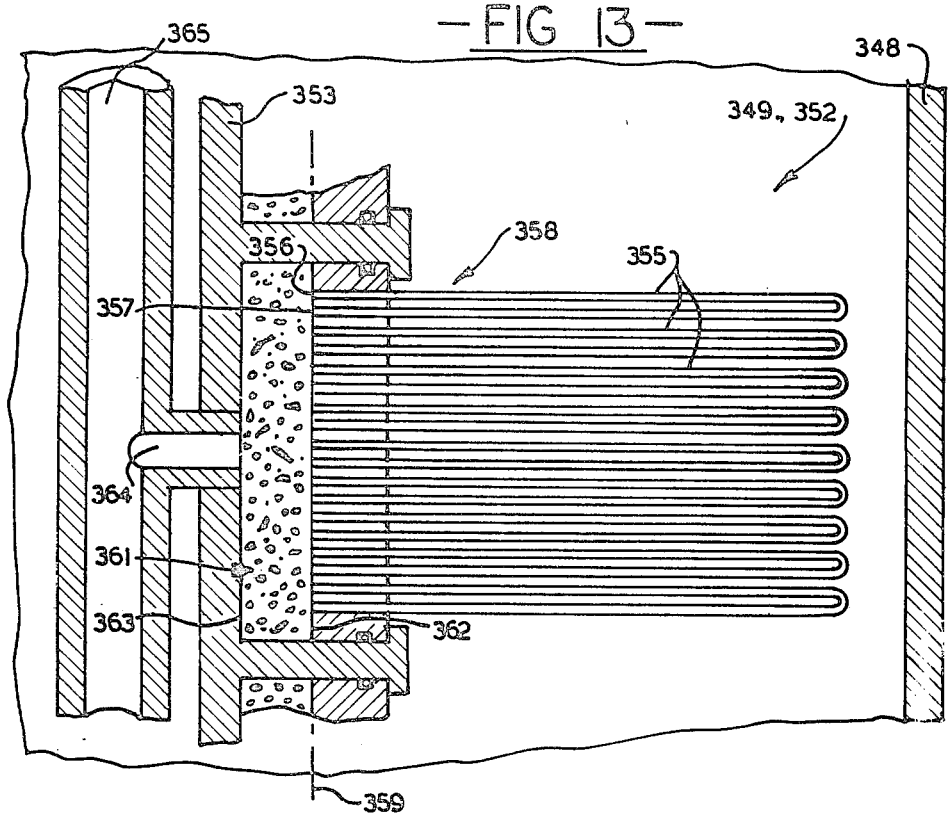

ROTARY REVERSE OSMOSIS APPARATUS AND METHOD

CROSS REFERENCES TO OTHER APPLICATIONS

This is a continuation-in-part of my application Ser. No. 806,704 filed June 15, 1977 entitled DOUBLE CONCENTRIC ROTOR APPARATUS FOR REVERSE OSMOSIS AND ULTRAFILTRATION, now abandoned.

BACKGROUND OF THE INVENTION

1. Field of the Invention

The invention relates generally to reverse osmosis and ultrafiltration fluid separation processes, and is applicable particularly to relatively large scale apparatus for water desalination and purification by reverse osmosis, liquid waste treatment and food dewatering.

2. Prior Art

Desalination by reverse osmosis is achieved by pumping a feed stream of saline water at an elevated working pressure into a pressure resistant vessel containing an array of semi-permeable membranes. Purified product water of greatly reduced salinity permeates across the membranes into low pressure collection channels if the working pressure exceeds feed stream osmotic pressure. Considerable excess working pressure above the feed stream osmotic pressure is required to produce sufficient product water flux across membranes of reasonable surface area, and also to ensure sufficient dilution of the small but finite salt diffusion through the membrane which always exists when there is a concentration gradient across such membranes. For sea water whose osmotic pressure is about 25 Kg/sq. cm, typical working pressure for single stage reverse osmosis is in the order of 70 Kg/sq. cm.

While some of the feed stream permeates through the membranes, the balance becomes increasingly concentrated with salt rejected by the membranes. In a continuous reverse osmosis process, a concentrate stream must be exhausted from the vessel to prevent excessive salt accumulation. In sea water desalination, this concentrate stream may be typically 70% and sometimes as much as 90% of the feed stream. The concentrate stream leaves the vessel at almost full working pressure, but before the concentrate stream is exhausted from the apparatus, it must be depressurized. The concentrate stream is commonly depressurized by throttling over a suitable back pressure valve, for example a restrictor valve, which regulates the working pressure while dissipating all the pressure energy of the concentrate stream, but sometimes concentrate stream pressure energy is recovered using recovery turbine devices.

Furthermore, for high recovery concentration polarization must be controlled. Concentration polarization in the feed stream is the tendency for a concentration gradient to develop in the feed stream with high salt concentration on the membrane face during reverse osmosis. This tendency results from the bulk transport of saline feed water toward the membrane face and the accumulation of salt in the boundary layer as less saline water permeates through the membrane, balanced by diffusion of salt back out of the boundary layer. Concentration polarization is detrimental especially with feed solutions of high osmotic pressure such as sea water, because the membrane sees a higher concentration which raises the effective osmotic pressure. When concentration polarization occurs, working pressure for given product flux must be increased, product salinity will be increased, and membrane life may be impaired.

Reverse osmosis systems are typically designed to reduce concentration polarization effects by forced convection through the membrane array. Forced convection may be provided by circulating the feed fluid with a low ratio of product flow to concentrate flow through suitably configured feed channels between the membrane faces, or by auxiliary recirculation or by mechanical stirring devices. Operation at low ratios of product flow to concentrate flow is also generally favourable to the reduction of concentration polarization effects, but of course increases the feed pumping energy expenditure for a given product flow delivery.

Fouling by particulate or colloidal matter suspended in the feed water, by precipitates or by biological organisms is a severe problem in many potential industrial applications for reverse osmosis and ultrafiltration. Applications with a high risk of fouling have been generally handled using the tubular membrane configuration, in which the membranes line the bore of relatively large diameter and easily cleaned tubes. The tubular configuration is more bulky and costly than other membrane mounting systems.

Conventional single stage centrifugal pumps have been used as feed pumps to attain working pressures required for reverse osmosis. Large energy losses arise because a high speed and relatively large diameter impeller is revolving in a fixed casing. This results in high "disc friction" power losses arising from fluid drag between the casing and the impeller. Disc friction power loss is proportional to the cube of the relative velocity between impeller and casing, is almost independent of pump delivery flow, and is largely responsible for the low efficiency of small high head single stage pumps.

Energy transfer within a radial flow, high head centrifugal pump impeller is divided equally between static centrifugal pressure and kinetic energy of rotation. The diffuser accepts the high velocity fluid ejected from the impeller, and decelerates it to convert the kinetic energy into a further increment of pressure energy. Usually the efficiency of energy transfer in the impeller is much better than that of pressure recovery in the diffuser because of diffuser entrance and expansion losses. It is known to improve efficiency by providing an auxiliary rotor revolving intermediately between impeller and fixed casing but this increases complexity of redundant moving parts and the efficiency is decreased by transferring fluid from a moving diffuser to a stationary casing.

Reverse osmosis systems using rotary membrane pressure vessels are known, and take advantage of centrifuge action to reduce fouling of the membranes by suspended solids or colloidal matter and also to reduce concentration polarization. Some systems using external and physically separate feed pumps to pressurize the membrane rotor have serious practical and economic disadvantages of high pressure rotary seals and have low energy efficiency because of the use of conventional pump and turbine components.

Other known devices use rotary membrane pressure vessels which use centrifuge action to generate the entire working pressure required by the membranes as static centrifugal pressure. None of the kinetic energy of rotation is recovered as pressure energy, and indeed the kinetic energy imparted to permeated product fluid is lost when the permeate fluid is ejected from nozzles. Because relatively high tangential rotor speed is necessary to generate the working pressure, relatively large windage losses arise due to aerodynamic drag of a large high speed rotor. As the static centrifugal pressure rises quadratically with radial distance from the axis of rotation, only a thin annular volume within the membrane container vessel will practicably be available for active membranes as the pressure build-up rapidly becomes excessive moving outward from the radius where the necessary working pressure is first attained. In fact, apparatus in which all working pressure is generated by rotation of the membrane container vessel are limited realistically to relatively low pressure applications. The high working pressures required for reverse osmosis desalination of sea water and many other applications would result in an extremely high tangential rotor speed at the radius where the working pressure is attained. Such a high speed rotor, necessarily large to contain much useful membrane area, would have difficult stress and vibration design problems, and would not have high energy efficiency because of kinetic energy lost with the ejected permeate fluid and external windage losses.

SUMMARY OF THE INVENTION

The invention reduces the difficulties and disadvantages of the prior art by providing an apparatus in which feed pump losses incurred in pressurizing the feed fluid are reduced from losses incurred in conventional pumps by rotating both the impeller and diffuser of the feed pump. The diffuser is rigidly connected to a membrane pressure vessel which, for most applications, rotates at a speed less than impeller speed and thus enery recovery in the diffuser is improved. Because working pressure of feed fluid in the membrane vessel is due to the feed pump and not due to rotation of the membrane vessel, the membrane vessel can be rotated at a lower speed, reducing stresses on the membranes and reducing windage losses of a rotating membrane vessel. The impeller and membrane pressure vessel are mounted for simultaneous rotation about a common axis which simplifies construction of the apparatus because high pressure, high speed rotary seals are essentially eliminated. By combining a rotating diffuser with the membrane pressure vessel, the advantages of a rotary diffuser are attained without resorting to an auxilary rotor revolving intermediately between the impeller and casing. Rotation of the membrane vessel improves membrane working conditions by generating free convection of feed fluid, which reduces fouling of the membrane faces with solids and furthermore inhibits concentration polarization within the feed fluid.

In most applications the present invention enables great reduction of disc friction losses, since the relative velocity between impeller and its casing integral with the membrane pressure vessel may be reduced, for example, by a factor of two, reducing disc friction power losses by a factor of eight for an impeller of the same diameter and shaft speed.

An apparatus according to the invention is for separation of a feed fluid into concentrate and permeate fluid fractions by pressure applied to selective membrane means. The apparatus includes first and second rotors, and means to power the first rotor for rotation about a central axis at a first angular velocity. The apparatus has means to recover energy from at least one of the fluid fractions when being removed from the second rotor. The first rotor has impeller means to impart pressure energy and kinetic energy to the feed fluid, and the second rotor has membrane pressure vessel means to contain and support the membrane means. The apparatus is further characterized by the second rotor having a diffuser means for the impeller means and being mounted for rotation about the central axis at a second angular velocity so that the diffuser means converts some of the kinetic energy of the feed fluid from the impeller means into a further increment of pressure energy. The second angular velocity is less than the first angular velocity and in most applications the rotors are adapted to rotate in the same direction.

Another embodiment of the invention includes a membrane rotor having permeate fluid discharge means to eject permeate fluid from the membrane rotor, and concentrate fluid discharge means to remove the concentrate fluid from the membrane rotor. The apparatus is further characterized by a turbine rotor extending around the permeate fluid discharge means of the membrane rotor and carrying turbine means exposed to the permeate discharge means so that the turbine rotor receives permeate fluid ejected from the membrane rotor to recover some energy from the permeate fluid fraction. In all embodiments of the invention, energy recovered from the concentrate fluid fraction and/or permeate fluid fraction can be directly transmitted to rotate the membrane means, or can be used indirectly for other sources of power.

A method according to the invention utilizes apparatus as above described and the feed fluid is pressurized in a feed pump by rotating at a first angular velocity the impeller means which cooperates with the diffuser means to impart pressure energy and kinetic energy to the feed fluid. The method is further characterized by simultaneously rotating the diffuser means with the membrane means at a second angular velocity. In most applications the second angular velocity is less than the first angular velocity and the rotors rotate in the same direction so as to reduce feed pump fluid friction losses and improve efficiency of pressure recovery in the diffuser means.

A detailed disclosure following, related to drawings, describes a preferred apparatus and method according to the invention, which are capable of expression in apparatus and method other than that particularly described and illustrated.

DESCRIPTION OF THE DRAWINGS

FIG. 2 is a simplified fragmented section taken generally on line 2—2 of FIG. 1, showing simultaneously impeller pump and energy recovery turbine details, FIG. 3 is a simplified fragmented section in an axial plane of a second embodiment of the invention showing integral pump impeller and energy recovery turbine combination, FIG. 4 is a simplified fragmented section in an axial plane of a third embodiment of the invention showing reaction nozzles mounted on a membrane pressure vessel, as would be seen generally from line 4—4 of FIG. 5, FIG. 5 which appears on sheet 2 of the drawings, is a simplified fragmented section taken generally on line 5—5 of FIG. 4, showing concentrate and permeate fluid fraction discharge means, FIG. 6 is a simplified fragmented section in an axial plane of a fourth embodiment of the invention utilizing a pitot tube feed pump with energy recovery nozzles on the membrane pressure vessel, FIG. 7 is a simplified fragmented section in an axial plane of a fifth embodiment of the invention utilizing integral pitot tube pump and energy recovery reaction nozzle means within a rotatable integral external impeller and diffuser casing, FIG. 8 is a simplified fragmented section on line 8—8 of FIG. 7, showing pump and energy recovery means, FIG. 12 is a simplified fragmented section within a horizontal plane of alternative membrane means which can be used in other embodiments of the invention, FIG. 13 is a simplified fragmented section on line 13—13 of FIG. 12 showing details of membrane tubes of the alternative membrane means.

DETAILED DISCLOSURE

Figure 1:
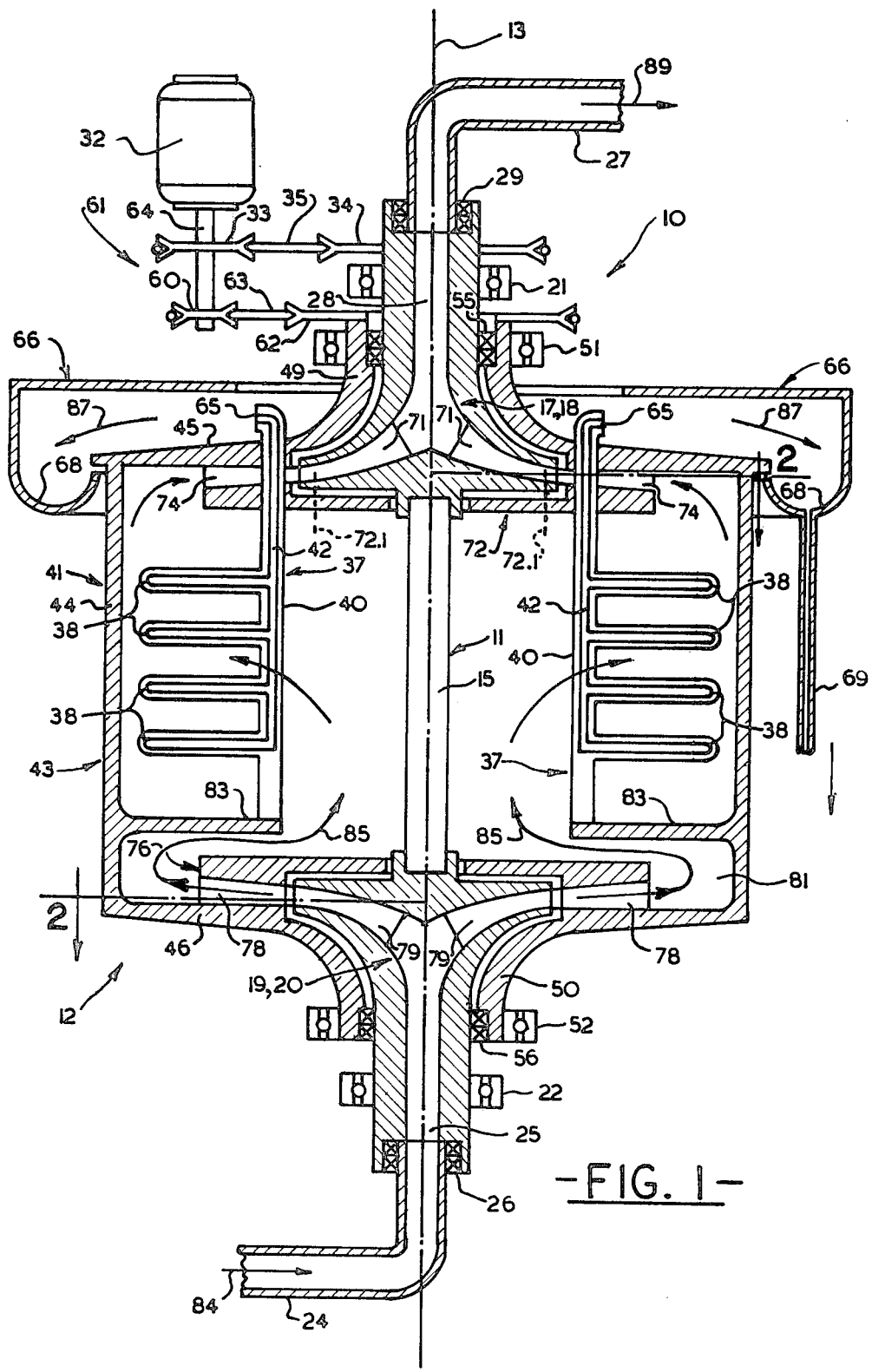
FIG. 1 is a simplified fragmented section in an axial plane of a first embodiment of the invention utilizing a separate centrifugal feed pump and centripetal energy recovery turbine means, as would be seen generally from line 1—1 of FIG. 2.

FIGS. 1 and 2

A first embodiment 10 of apparatus according to the invention includes first and second rotors 11 and 12 journalled for rotation about a common central axis 13. The first rotor includes a shaft 15 mounted concentrically about the axis 13 and carrying at an upper end a centripetal turbine runner means 17 of a concentrate fluid energy recovery turbine means 18, and at a lower end a centrifugal pump impeller means 19 of a feed pump 20. The turbine runner means and the impeller means are journalled in bearings 21 and 22 respectively and carried in supporting sturcture, not shown.

A feed fluid supply conduit 24 communicates with an inlet duct 25 of the pump impeller 19 and is sealed with rotary seals 26. A concentrate fluid exhaust conduit 27 communicates with an exhaust duct 28 of the turbine runner 7 and is similarly sealed with rotary seals 29. A motor 32, through pulleys 33 and 34 and a drive belt 35, is connected to the turbine runner 17 and serves as a means to power the shaft 15 and thus powers the pump impeller means as required.

The second rotor 12 contains semi-permeable membrane means 37 which includes a plurality of membrane elements 38 disposed in arrays as shown schematically and carried on support means 40 which includes an integral permeate fluid collection duct means 42. The membrane means 37 can be one of many types of known membrane configurations, such as sheet membrane material backed by porous support material in plate and frame stacks, sprial rolled or tubular elements, or small diameter hollow fibers capable of withstanding working pressure. Examples of membrane arrays are described with reference to FIGS. 11 through 13, and the array is selected to take advantage of forced convection from rotation of the membrane vessel, as will be described, which inhibits fouling of the membrane elements. The convection also inhibits concentration polarization in the feed fluid by free convection driven by the centripetal acceleration field acting on buoyancy gradients within the feed fluid so that more dense solution forming in the membrane boundary layer is driven radially outwards. The permeate fluid collection ducts 42 are disposed parallel to the axis 13 and are shown at two diametrically opposed positions but clearly at least one duct is required to communicate with all the membrane elements but preferably more can be provided spaced equally peripherally within the chamber. It is important that all discharge means 65 are located at similar radial distances from the axis 13 to discharge the permeate fluid fraction, as will be described.

The second rotor is a pressure membrane vessel 43 having a cylindrical side wall 44 and top and bottom walls 45 and 46. The walls 45 and 46 flare outwardly to top and bottom annular support rings 49 and 50 which are journalled on bearings 51 and 52 carried in the supporting structure, not shown. Rotary seals 55 and 56 are fitted between the support ring 49 and turbine runner 17, and the support ring 50 and the pump impeller 19 respectively. The motor 32 through pulleys 60 and 62 and a drive belt 63 also powers the second rotor. It can be seen that the pulleys 33 and 60 are mounted on a common drive shaft 64 of the motor, the several pulleys and belts being designated transmission means 61. Ratio of the pulleys 33 to 34, and the pulleys 60 to 62 are different so that the first and second rotors rotate preferably at different speeds but in the same direction, as will be described. At an upper end of the apparatus, the permeate fluid collection ducts 42 extend through the top wall 45 to permeate discharge orifice means 65 which project radially outwardly into a stationary collection shroud 66. The shroud has a collecting channel 68 communicating with a permeate discharge duct 69 which discharges the permeate fluid fraction into a collection means, not shown, as required.

As best seen in FIG. 2, the turbine runner 17 has a plurality of turbine runner vanes 71 defining runner channels 70 therebetween, the channels communicating with the turbine exhaust duct 28. The second rotor 12 has turbine nozzle means 72 having turbine nozzle vanes 73 defining inwardly tapering turbine nozzle channels 74 which direct concentrate fluid from the pressure vessel into the runner channels 70 of the turbine runner 17. Inlets to the nozzle channels 74 are spaced radially outwardly of the membrane means to receive mostly concentrate fluid with negligible mixing of feed fluid, and thus it can be seen that the turbine nozzle means 72 is effectively baffled to receive concentrate fluid only from the membrane means. The turbine nozzle means 72 is mounted adjacent the turbine runner means 17 to provide the concentrate fluid energy recovery turbine means 18 disposed remotely from the impeller to recover energy from the concentrate fluid as it is discharged from the second rotor.

The impeller means 19 is generally similar to the turbine runner means 17 and has impeller vanes 79 defining impeller channels 80 therebetween. The impeller cooperates with a diffuser means 76 mounted on the second rotor remotely from the turbine nozzle means 72 and having diffuser vanes 77 which define outwardly expanding diffuser channels 78 therebetween. The diffuser 76 communicates the impeller 19 with an annular collector channel 81 partially defined by an annular baffle 83 which supports in part the membrane means 37.

Thus, in summary, it can be seen that the impeller means 19 of the first rotor is a centrifugal impeller, and the diffuser means 76 of the second rotor has a plurality of diffuser channels which expand outwardly and communicate at inner ends thereof with the impeller means and at outer ends thereof with the pressure vessel means. It can be seen that the diffuser means 76 of the second rotor is disposed generally radially outwardly of and adjacent the impeller means 19 of the first rotor and with the nozzle means are disposed remotely from the diffuser means.

As best seen in FIG. 2, the centrifugal impeller 19 and associated diffuser 76, and the turbine runner 17 and the turbine nozzle means 72 are geometrically similar. The turbine runner 17 and centrifugal impeller means 19 are shown as similar shrouded rotor designs, but partially shrouded or non-shrouded designs can be substituted. Shapes of the nozzle channels 74 and diffuser channels 78 may be round or rectangular in section, and may be straight or curved. It may be advantageous to curve the channels between the vanes, as shown in FIG. 2, to compensate for coriolis effects of fluid moving radially in a rotating passage. Any number of vanes and channels may be used and, with regards to the feed pump means 20, for low pump specific speeds associated with high heads and small flows, partial emmission design using one or two diffuser channels is likely to offer best efficiency. For high pump specific speeds associated with low heads and large flows, vaneless diffuser space 82, designated in FIG. 2 only, may be expanded to provide most or all of the diffusion effect with the diffuser channels reduced to simple passages of suitable cross section between structural supports or nontapered vanes.

OPERATION

Referring mainly to FIG. 1, a supply of feed fluid is passed onto the feed fluid supply conduit 24 in direction of an arrow 84 and the motor 32 rotates the first and second rotors 11 and 12 about the axis 13. The transmission means 61 between the first and second rotors causes the pump impeller 19 and turbine runner 17 to be rotated simultaneously at a higher speed than the membrane vessel but both rotors rotate in the same direction. Thus the rotors are coupled to rotate in the same direction so that the diffuser means of the second rotor rotates about the central axis at a second angular velocity less than the first angular velocity of the first rotor. Fluid is pumped from the impeller pump 19 and is guided by the baffle 83 in direction of arrows 85 towards the shaft 15 from where it is centrifuged outwardly past the membrane means 37 due to rotation of the second rotor. The rotation of the vessel 43 augments absolute pressure in the feed fluid by centrifugal action above the pressure imparted by the impeller pump, but note that working pressure, ie. pressure difference across the membranes, is uninfluenced by centrifugal forces and is due entirely to the feed pump. Permeate fluid passes across the membranes into the permeate fluid collecting duct 42 and passes upwardly and outwardly through the discharge means 65 where it is thrown outwardly in direction of arrows 87 to be collected in the collecting shroud 66 from where is is drained through the permeate duct 69.

The feed fluid passes generally radially outwardly between the membrane elements 38 and becomes increasingly concentrated by depletion of permeate fluid and finally emerges as concentrate fluid generally adjacent the wall 44. This concentrate fluid is guided into the turbine nozzle means 72 of the turbine 18 to accelerate the concentrate fluid into the turbine runner 17. From the turbine runner 17, the concentrate fluid is depressurized and passes through the exhaust duct 28 and the conduit 27 in direction of an arrow 89 to be collected as required.

It can be seen that because the second rotor 12 rotates at a slower speed than the first rotor 11, there is a relative velocity difference between the diffuser means 76 and the pump impeller 19. The feed fluid enters the vaneless diffuser space 82 of the pump with high tangential velocity of the impeller means 19, and because the second rotor is revolving slower than the first rotor, relative velocity of the feed fluid adjacent entrances of the diffuser channels 78 is proportionately reduced. As the diffuser channels widen with increasing radius, the feed fluid is decelerated until it enters the collector channel 81 at a lower relative velocity. The diffuser 76 receives rotating fluid from the impeller 19 and thus tends to rotate as a reaction to impingement of the rotating fluid. This assists in rotation of the second rotor and thus the transmission means 61 to drive the rotors may be relatively lightly loaded.

As previously stated, half of the energy imparted to the feed fluid by the pump impeller is kinetic energy of rotation but only part of this kinetic energy is available for conversion into pressure energy because the fluid leaving the diffuser 76 is revolving at about the same angular velocity as the second rotor 12. Hence, more than half the total pressure is obtained statically with high efficiency in the impeller, and less than half is converted with lower efficiency in the diffuser. Thus, overall efficiency is improved when compared with a pump with a non-rotating diffuser, and this improvement is attained without recourse to known techniques using an auxiliary or intermediate rotor disposed between a rotating impeller and a fixed casing. In practice, efficiency of static pressure recovery within a rotating diffuser is likely to be improved relative to the fixed diffuser because much reduced velocity of the diffuser components relative to the fluid leaving the impeller enables better hydraulic design since errosion and cavitation problems are less likely. Within the pump the fluid follows a shorter path with less friction losses and thus use of a rotating diffuser produces an overall improvement in performance when compared with a similar pump operating in a fixed diffuser casing. It is noted that, for the same shaft speed, in view of the rotation of the diffuser, a larger rim speed of impeller is required to attain the same static pressure. Losses due to the larger impeller are less than the losses that would be incurred by utilizing a fixed diffuser casing and the other advantages above are considerable. Similar considerations and advantages apply to the centripetal turbine runner 17 and the turbine nozzle means 72 which is similarly rotated because it is integral with the second rotor. Since the efficiency of both feed pump and concentrate fluid recovery turbine are considerably improved, energy efficiency of permeate production will be greatly enhanced, especially for systems operating at low feed fluid to permeate fluid conversion ratios.

Because the membrane pressure vessel 41 is not pressurized to the membrane working pressure by centrifuge action as in some prior art devices, it need not revolve at very high speed. For desalinating sea water using a membrane or second rotor having a diameter within the range of 2 to 2.5 meters, it is anticipated that a typical centrifugal impeller 19 having a diameter of about 0.5 meters would rotate at about 3600 r.p.m., whereas the membrane rotor would rotate at about 1200 r.p.m. The relatively low speed of rotation of the second rotor produces moderate windage losses, and because the static pressure due to centrifuge action increases relatively slowly with increasing radial distance from the axis 13, the membrane pressure vessel need not be very highly stressed. As will be described with reference to FIGS. 11 through 13, preferably the membrane elements extend radially outwardly from the axis, in axial planes or lie in parallel diametrical planes to exploit centrifuge action which tends to carry any matter of specific gravity greater than the feed fluid radially outwardly and off the membrane faces. This inhibits membrane fouling and facilitates treatment of feed fluids containing substantial amounts of suspended solids as in waste treatment or food dewatering applications. The centrifuge action also inhibits concentration polarization by free convection resulting from centripetal acceleration fields acting on density differences due to concentration gradients. More dense concentrate solution collected on the membrane wall is driven outwards from the axis of rotation by differential buoyancy effects enabling improved salt diffusion away from the membrane face across a relatively thin boundary layer.

Thus, in summary, it can be seen that the method of the invention separates the feed fluid into concentrate and permeate fluid fractions by pressurizing feed fluid in the feed pump by rotating at the first angular velocity the impeller means 19 which cooperates with the diffuser means 76 to impart pressure energy and kinetic energy to the feed fluid. The membrane means 37 are simultaneously rotated with the diffuser means at a second angular velocity, which is preferably less than the first angular velocity to reduce pump fluid friction losses and to improve pressure recovery in the diffuser means. It can be seen that working pressure of the feed fluid adjacent the membranes is generated with higher efficiency than that obtained by the impeller rotating in a fixed diffuser means.

ALTERNATIVES AND EQUIVALENTS

In FIGS. 1 and 2, the first and second rotors are shown coupled together by the transmission means 61 and driven by the motor 32 or other prime mover. In this arrangement it can be seen that energy recovered from the concentrate fluid turbine is directly used to power the impeller 19, which is mounted on the common shaft 15, and the balance of power to rotate the second rotor is supplied by the motor 32. Thus, with efficient concentrate fluid energy recovery means, eg. the turbine 18, the transmission means 61 is lightly loaded and relatively little power is supplied by the motor.

Clearly, in an alternative, not shown, the turbine runner 17 can be journalled on a separate shaft not coupled directly to the impeller means 19, and power taken from the turbine can be used to drive an electrical generator, not shown, which is then used to power the pump or other means can be substituted. Similarly, the power from the turbine need not be directly transmitted to drive the second rotor which can be driven by other means. The second rotor could, in fact, be free-wheeling with no mechanical connection between the first and second rotors. In this alternative, not shown, rotation of the second rotor could be due to reaction to rotating fluid exhausted from the pump impeller means, and thus, when free-wheeling, would attain a terminal angular velocity less than that of the first rotor, determined by reaction to fluid flow, and fluid and windage losses.

The improvement in pressure recovery efficiency as above described is attributed to rotation of the diffuser means 76 in the same direction as the impeller means 19 but at a lower angular velocity. In specific applications where, for example, high working pressure is desired with a relatively low impeller speed, the rotors could rotate in opposite directions over a wide range of angular velocity differences. Diffuser pressure recovery losses and impeller disc friction losses would likely increase greatly but this might be acceptable in unusual or specific applications of the apparatus. Whilst the embodiments following are similarly described for the second rotor revolving more slowly than the first rotor, similar variations of relative velocities of the rotors as described above are envisaged.

It will also be evident that multistage configurations could be substituted for the single stage centripetal pump and centripetal turbine illustrated in FIG. 1. The diffusers for each stage of a multistage pump could all be fixed within the second rotor.

FIG. 3

A second embodiment 94 of the apparatus according to the invention is generally similar to the first embodiment 10 of FIGS. 1 and 2 but differs by providing an alternative combination pump impeller and turbine runner combination rotor 95 as an integral rotating unit. Similarly to the previous embodiment, the apparatus has first and second rotors 99 and 100, and a motor 102 serving as a means to power the first rotor for rotation about a central axis 104 at a first angular velocity. The impeller and runner combination 95 is mounted on the first rotor and has a centrifugal pump impeller means 106 and an integral centripetal turbine runner means 105. The impeller means 106 imparts pressure energy and kinetic energy to the feed fluid and the turbine runner means serves as alternate means 108 to recover energy from the concentrate fluid. The second rotor has pressure vessel means 107 to contain and support membrane means 109 and permeate fluid from the membrane means passes through discharge orifice means 110 into an annular collection shroud 112 and through a permeate discharge duct 113, as in the previous embodiment. Drive belt and pulley combinations 114 and 115 through a journalled shaft 117 couple the motor 102 to the second rotor 100 to rotate the second rotor at a fixed angular velocity difference relative to the first. Undesignated seals and journals provide sealing and bearing means, and feed fluid supply conduit 119 conducts feed fluid to the apparatus, and concentrate fluid exhaust conduit 121 removes concentrate fluid from the apparatus, similarly to the previously described embodiment. The centrifugal impeller means 106 of the first rotor has an inlet duct 118 concentric with the central axis 104 to conduct feed fluid from the feed supply conduit 119 into the centrifugal impeller. The second rotor has an annular conduit means 120 connected thereto and surrounding a portion of the inlet conduit means of the centrifugal impeller, so as to define an annular exhaust passage 122 therebetween which communicates with the concentrate fluid exhaust duct 121.

The centripetal turbine runner 105 of the combination 95 includes a flared shroud 125 separating impeller channels 127 of the impeller means 106 from runner channels 128 of the turbine runner. It can be seen that the centripetal turbine runner means is thus mounted on the first rotor adjacent the impeller means, which contrasts with the first embodiment where the impeller and turbine runner are remote from each other. The impeller means is fully shrouded, and the turbine runner means is partially shrouded although both could be partially shrouded or fully shrouded. A convoluted and annular baffle means 129 separates diffuser channels 131 of a diffuser means 132 from turbine nozzle channels 133 of a turbine nozzle means 134. The diffuser means has diffuser inlet means 130 adjacent to but spaced axially from the turbine nozzle means 134 and mounted adjacent a lower end of the pressure vessel. The diffuser means 132 recovers feed fluid pressure and directs the feed fluid into the pressure vessel 107 to flow between the membrane means 109 where the permeate fluid fraction is separated. The fluid remaining leaves the pressure vessel as a concentrate fluid fraction through the turbine nozzle means 134 to pass through the turbine runner 105, permitting recovery of energy from the concentrate fluid. The diffuser means 132 and the nozzle means 134 are carried on the second rotor to rotate therewith and also support the membrane means 109, as previously described.

The combination rotor 95 has a periphery having turbine runner inlet means 135 of the turbine runner means 105 disposed circumferentially therearound and generally adjacent but spaced axially from impeller discharge means 136 of the impeller means 106. The turbine nozzle means guides and accelerates concentrate fluid into the turbine runner inlet means 135, and the diffuser means 132 accepts feed fluid from the impeller means 106. An inner portion 138 of the baffle 129 is generally aligned with and spaced closely to an outer end 139 of the flared shroud 125, and a small clearance gap 143 exists between the outer end 139 and the inner portion 138, the gap being as small as practical to reduce undesirable flow of feed fluid across the plane 137 and through the gap. A generally diametrical plane 137 which is normal to and concentric with the central axis 104 is generally aligned with outer ends of the shroud 125 and the baffle 129. The plane is defined as being interposed between the runner inlet means 135 and the impeller discharge means 136 and thus is also interposed between the nozzle means 134 and the diffuser inlet means 130. The plane 137 is, in fact, a general surface of revolution centered on the axis 104 and can be a shallow cone, depending on angles of the diffuser inlet means 130 and the turbine nozzle means 134, and the impeller discharge means 136 and the runner inlet means 135 which straddle the plane 137, as adjacent sets of openings.

If required, a labyrinth seal or other seal means generally coincident with the plane 137 can be provided to reduce recirculation of fluid across the diametrical plane. One example of a simple labyrinth seal is a generally annular shroud 146 extending from the outer end 139 of the flared baffle 125 and disposed intermediately between the turbine runner inlet means 135 and the impeller discharge means 136 so as to extend across an annular space within the plane 137 and to extend intermediately between the turbine nozzle means 134 and the diffuser inlet means 130. The shroud 146 is shown mounted on the combination rotor of the impeller and turbine runner to extend outwardly therefrom, and if desired an outer edge thereof can be received in a complementary groove, not shown, on the inner portion 138 of the baffle 129. Alternatively, an annular shroud, not shown, can be located on the inner portion 138 so as to extend inwardly into a complementary recess on the combination rotor 95. In either location the annular shroud directs oppositely flowing fluid between the impeller and diffuser means, and between the turbine nozzle means and the turbine runner means to reduce fluid recirculation therebetween. In practice, a small amount of fluid leakage across the seals can be tolerated as this would result in feed fluid short-circuiting into the exhausting concentrate fluid with negligible effect on overall efficiency of the device.

Thus, in operation of the embodiment 94, feed fluid passes through the feed fluid supply conduit 119, through the inlet duct 118 where it is pressurized by the impeller means 106 and is directed by the baffle 129 towards the axis 104 within the pressure vessel. The feed fluid passes outwardly between the membrane means 109 and becomes more concentrated and is exhausted from the pressure vessel as concentrate fluid to be again directed by the baffle 129, this time inwardly and into the turbine runner 105, through the annular passage 122 and out through the concentrate exhaust conduit 121. The baffle 129 thus serves as a baffle means to direct fluid from the diffuser means to the membrane means and thence to the turbine runner means. Thus the integrated pump impeller and turbine runner combination rotor 95 with coaxial ducts permits some simplification in impeller sealing and disc friction is reduced considerably from separate pump impeller and turbine runners of FIGS. 1 and 2.

FIGS. 4 and 5

A third embodiment 150 of the invention differs from the previous embodiments 10 and 94 by substitution of an alternative concentrate fluid energy recovery means 152 for the centripetal turbine recovery means of the previous embodiments. The embodiment 150 has first and second rotors 154 and 155 journalled for rotation about a common central axis 156. The first rotor has a feed pump impeller 157 and is powered by a motor 158 to pressurize feed fluid from a feed fluid conduit 159. The second rotor 155 is powered through a pulley and drive belt transmission means 161 to rotate at a speed slower than the first rotor, and has a pressure vessel 162 containing and supporting membrane means 163 therein. A plurality of radially elongated spacers 164, FIG. 5 only, restrict flow thereover to essentially radial flow, while tie rods 168 support the membrane array, as will be described with reference to FIG. 11. A permeate duct means 165 communicating with the membrane means discharges permeate fluid from discharge means 166 into a permeate fluid collecting shroud 167, similarly to the previously described embodiment.

As best seen in FIG. 5, the concentrate fluid energy recovery means 152 includes a pair of generally tangentially disposed nozzle means 170 and 171 cooperating with the second rotor 155, the nozzle means communicating with the interior of the pressure vessel to convert pressure energy of the concentrate fluid fraction received from the membrane means into kinetic energy. The nozzles are inclined to direct the concentrate fluid fraction generally tangentially in a direction opposite to direction of rotation of the second rotor, shown as arrow 172, so that torque reaction from the nozzles assists in rotation of the second rotor. A concentrate fluid collecting shroud 173 surrounds the second rotor and has an annular opening 174 therein adjacent an inner wall thereof and positioned so as to receive the nozzle means and concentrate fluid ejected from the nozzle means. A concentrate fluid exhaust duct 176 discharges collected concentrate fluid.

The nozzles must be adjusted so that pressure drop at operating fluid flow rate is equal to desired pressure within the pressure vessel of the second rotor. Variable nozzle orifices may be used in the nozzle means with an automatic control system sensing pressure and adjusting orifice openings to correct any deviations from the desired pressure, such control systems being known. Concentrate fluid, with any other suspended solids of specific gravity at least equal to the concentrate fluid accumulates adjacent an outer wall 177 of the second rotor after passing through the membranes and is then discharged through the concentrate nozzles. Stirring means or vanes, not shown, can be provided to transport solids retained against the outer wall 177 to the nozzles, and these means might be necessary to prevent accumulation of solids within the pressure vessel. Efficiency of energy recovery from the concentrate fluid is limited by nozzle losses and also by the fact that jet exit velocity is generally somewhat greater than tangential velocity of the nozzle means. This is because energy was imparted to the feed fluid by the pump impeller 157 having an angular velocity exceeding angular velocity of the second rotor. Use of tangentially disposed nozzles mounted peripherally on the second rotor has particular advantages when processing feed fluids containing a significant load of suspended solids, such as in food products and waste.

FIG. 6

A fourth embodiment 180 of the invention has first and second rotors 181 and 182 journalled for rotation about a common axis 183. Undesignated bearings and seals journal the rotors for rotation and prevent leakage of fluid as in the previously described embodiments. First and second motors 185 and 186 power the first and second rotors respectively through pulley and drive belt combination 187 and by direct drive respectively. Similarly to the previous embodiments, the second rotor is a pressure vessel 188 containing membrane elements 189 which discharge the permeate fluid fraction through permeate orifices 191 into a permeate collecting shroud 193 which discharges permeate through a permeate discharge conduit 194. Similarly to the FIG. 5 embodiment, concentrate fluid discharge nozzles 196 and 197 discharge concentrate fluid into a concentrate fluid collecting shroud 198, the collected concentrate fluid being discharged through a concentrate exhaust conduit 200. The nozzles are tangentially disposed and permit recovery of some energy from the concentrate fluid as it is discharged from the membrane vessel.

The fourth embodiment differs from the third embodiment by use of a substitute feed pump 202 in which the relative arrangement of impeller and diffuser is inverted to place the impeller outside the diffuser. A feed fluid conduit 204 supplies feed fluid through a rotary seal 205. The feed pump 202 has a rotatable chamber 208 which is the first rotor 181, the chamber having an inlet conduit 211 communicating with the feed conduit 204. The chamber 208 encloses a rotatable conduit means 209 which extends outwardly and axially from the vessel 188 and has a discharge conduit 213 communicating with the interior of the vessel 188. The rotatable chamber has an inner surface 215 which is ribbed, roughened or has other fluid entrainment means to induce rotary motion of the chamber into the feed fluid within the chamber. In the ideal, solid body rotation of the feed fluid within the chamber is attained. The chamber thus serves as the impeller means of the first rotor, which in this case, is driven independently of the second rotor.

The conduit means 209 has an arm 214 rigidly attached to the discharge conduit 213 and having a feed fluid passage 216 having a generally tangentially inclined inlet opening 217 at an outer end of the arm to receive the feed fluid induced to rotate within the chamber 208. The feed fluid passage 216 expands inwardly to serve as a diffuser means of the second rotor and it communicates at an inner end thereof with the discharge conduit 213 and thus with the pressure vessel means. The motors 185 and 186 serve as means to power the rotors in the same direction so that the second rotor rotates at an angular velocity less than angular velocity of the first rotor. Thus feed fluid that is induced to rotate in the rotating chamber is rammed into the tangentially disposed inlet opening 217 in the arm, and as the feed fluid passes up through the expanding passage 216 kinetic energy of the feed fluid is converted into pressure energy which acts upon the membranes, as previously described.

The feed pump 202 is thus an inverted arrangement of impeller and diffuser of the conventional centrifugal pump and is known in the trade as a pitot tube pump or an external impeller pump in which the impeller means of the first rotor is disposed generally radially outwardly of the diffuser means of the second rotor. The embodiment shown has a single diffuser arm for a conduit means and clearly, for balancing purposes, a diametrically opposed arm may be used, and to reduce fluid drag, the arms are faired in cross section, as is well known. Alternatively, the conduit means can be fitted within a disc with passage outlets adjacent an outer periphery of the disc, generally similar to the embodiment to be described with reference to FIGS. 7 and 8. If a disc is used, fluid friction losses should be compared with losses incurred if one or more arms are used.

FIGS. 7 and 8

A fifth embodiment 222 of the invention differs from the fourth embodiment by providing an integral pitot tube pump diffuser and ejection nozzle combination 223 within a combination rotating external impeller and exhaust chamber. This structure is thus an inversion of the second embodiment of FIG. 3 and is in fact, a feed pump and energy recovery means for the feed and concentrate fluids respectively. The embodiment 222 has first and second rotors 225 and 226 journalled for rotation about a central axis 227 in undesignated bearings similar to the previously described embodiments. First and second motors 229 and 230 power the first and second rotors through a drive belt and pulley combination 232 and directly respectively. The first rotor is rotated about the axis 227 at a first angular velocity, and the second rotor rotates in the same direction at a second angular velocity less than the first angular velocity, similarly to the previously described embodiments.

The second rotor includes a pressure vessel 234 containing membrane means 235 which separate the feed fluid into permeate and concentrate fluid fractions, the permeate fluid being ejected through permeate orifices 237 into a permeate fluid collecting shroud 239 which is drained through a permeate exhaust duct 241. A feed fluid conduit 243 supplies feed fluid to the first rotor 225 and a concentrate fluid conduit 245 exhausts the concentrate fluid fraction from the apparatus.

The first rotor includes a rotatable chamber 247 having feed fluid and concentrate fluid compartments 249 and 250 disposed on opposite sides of a diametrical plane 252 extending through the chamber and being concentric with and disposed normally to the axis 227. The feed fluid compartment 249 has entrainment means on an inner surface 253 thereof similar to the entrainment means of the FIG. 6 embodiment and thus serves as an impeller. The concentrate fluid compartment has an inner surface 255 having similar entrainment or vane means to retrieve rotational energy of ejected concentrate fluid as will be described. The combination 223 includes a conduit means 257 having a feed fluid passage 259 having a generally tangentially inclined inlet opening 261 at an outer end thereof to receive the feed fluid induced to rotate within the rotatable chamber. The feed fluid passage expands inwardly to serve as a diffuser and communicates at an inner end thereof with the pressure vessel 234 through discharge conduit 263. The conduit means 257 is fitted within the diffuser and nozzle combination 223 which may be disc-like as an alternative to the previously described arm 214 of FIG. 6. The conduit means 257 of the combination 223 further includes a concentrate fluid discharge passage 265 having a nozzle 267 inclined generally tangentially to the central axis to discharge concentrate fluid into the concentrate fluid compartment 250. The inlet opening 261 and the nozzle 267 face tangentially in opposite directions so that rotation of the combination is compatible with flow outwards from the nozzle and inwards into the inlet opening.

Thus it can be seen that the pump and recovery means of the conduit means 257 includes integral pitot tube feed pump and recovery nozzle means which cooperate with the two compartments within the rotatable chamber. The feed fluid passage 259 communicates with the feed fluid compartment 249 to recover pressure energy and to discharge feed fluid therefrom, and the concentrate fluid discharge passage 265 communicates with the concentrate fluid compartment 250 and discharges concentrate fluid to recover velocity energy therefrom. An annular concentrate conduit 268 communicates the discharge passage 265 with outer portions of the pressure vessel so as to receive flow of concentrate fluid from the membranes, a flared annular baffle 269 preventing mixture of feed fluid flow in the conduit 263 with returning concentrate fluid flow in the conduit 268. To reduce mixing of feed and concentrate fluids across the diametrical plane 252 dividing the two compartments, an annular shroud 270 generally coincident with the diametrical plane extends inwardly from the chamber wall and is generally complementary to an annular recess 271 on the rotor so as to form a simple labyrinth seal arrangement to serve as a means to reduce recirculation of fluids across the diametrical plane. Alternatively, the shroud 270 can be mounted on the conduit means with the complementary recess provided in the casing similarly to the previously described embodiment of FIG. 3. Both of the seal structures disclose a shroud positioned to separate essentially the compartment 249 and 250 and are equivalent to the similar means described with reference to the embodiment 94 of FIG. 3. Concentrate fluid from the chamber 250 is exhausted to the conduit 245 through an annular duct 272.

In operation, with reference to FIG. 8, rotation of the chamber 247 and the combination 223 at different speeds produces a velocity difference shown as arrow 274 between the rotor and the chamber 247. The chamber rotates at a higher velocity than the combination 223 and the feed fluid is rammed into the inlet 261 to pass into the pressure vessel, and the concentrate fluid is discharged through the nozzle 267 so as to augment rotation of the second rotor.

Figure 9:
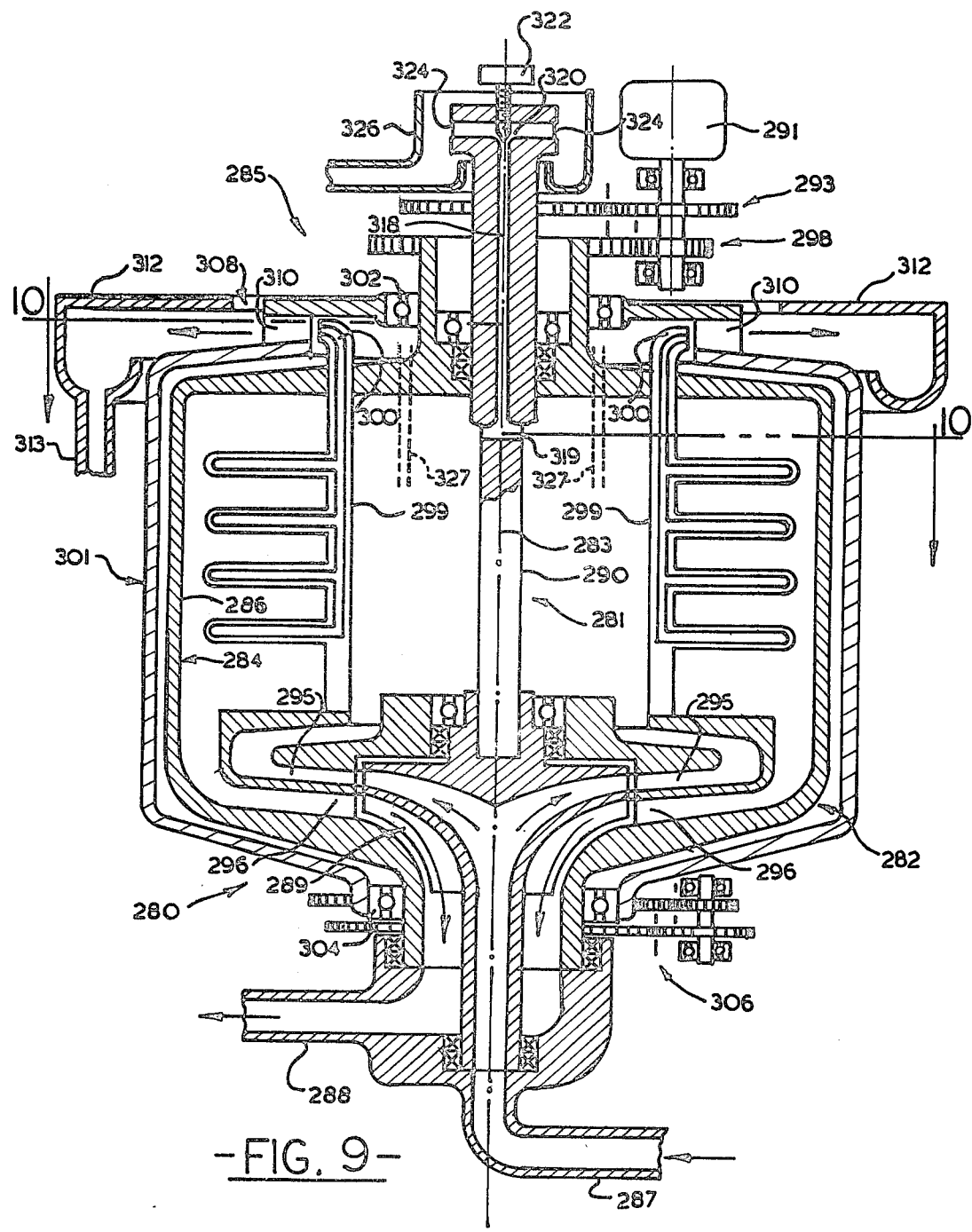
FIG. 9 is a simplified fragmented section in an axial plane of a sixth embodiment of the invention including a third rotor carrying impulse turbine means, generally on line 9—9 of FIG. 10.
Figure 10:
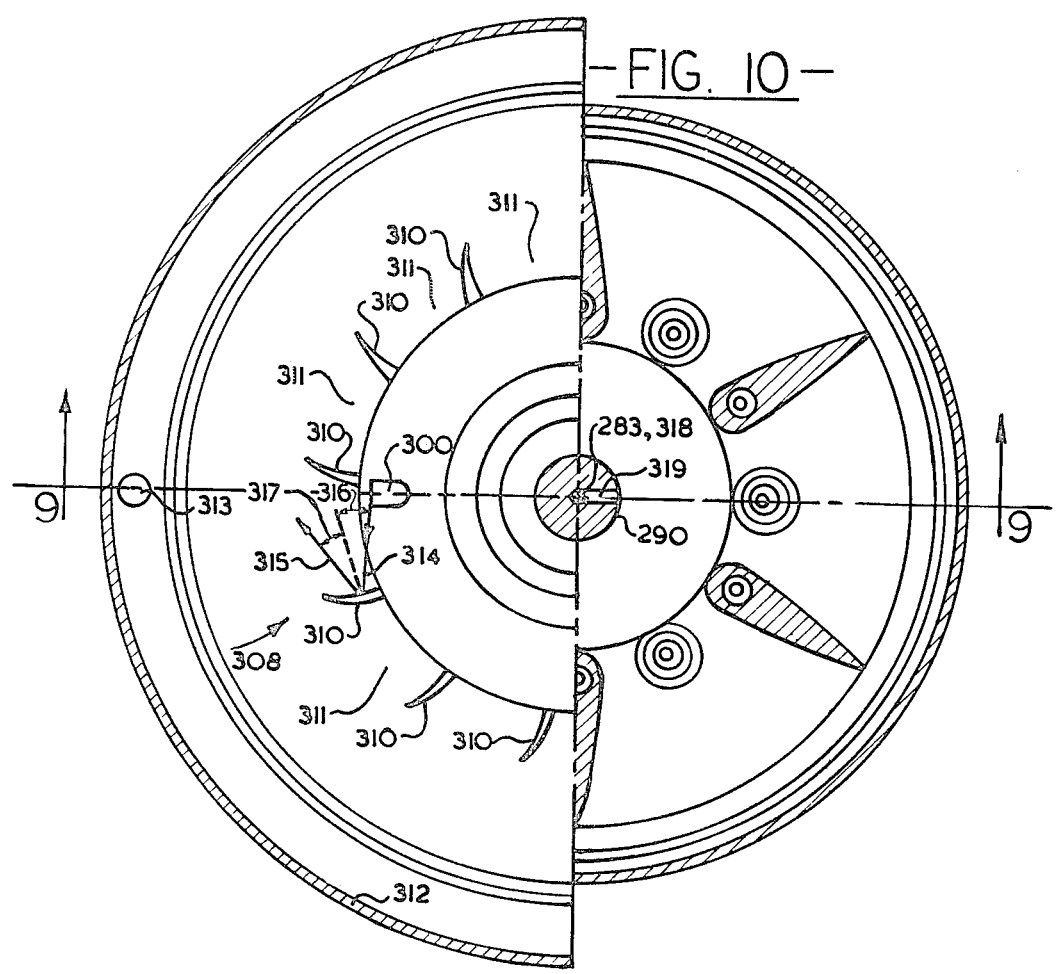
FIG. 10 is a simplified fragmented section on line 10—10 of FIG. 9.

FIGS. 9 and 10, With Reference to Previous Figures

A sixth embodiment 280 of the invention has first and second rotors 281 and 282 mounted for rotation about a central axis 283, the second rotor being a membrane rotor including a pressure vessel 284 having a cylindrical wall 286. This apparatus is particularly adapted to recover energy of permeate fluid permeated by the membranes and includes a permeate fluid energy recovery means 285 to recover velocity energy of the permeate fluid. The means 285 is shown cooperating with a structure generally similar to the embodiment 94 of FIG. 3, but alternative structures as previously described can incorporate this additional means to recover energy. Also other structures known in the art utilizing rotatable membrane vessels can be modified to recover permeate fluid velocity energy. Structure common to the FIG. 3 embodiment will be briefly described as follows.

The apparatus 280 has a feed fluid inlet conduit 287 and a concentrate fluid exhaust conduit 288 delivering feed fluid to, and exhausting concentrate fluid from, the apparatus. A pump and energy recovery combination rotor 289 is mounted on a shaft 290 of the first rotor 281, and is rotated at a first angular velocity by a motor 291 through a gear train transmission means 293 cooperating with the first rotor. A diffuser means 295 and turbine nozzle means 296 serve respectively to pressurize feed fluid for the pressure vessel within the first rotor, and to accelerate the returning concentrate fluid. Gear train transmission means 298 couples the second rotor to the motor 291 for rotation about the axis 283 at a second angular velocity less than the first angular velocity. Membrane means 299 are mounted within the second rotor and permeate fluid which permeates through the membrane means is discharged from the second rotor through permeate discharge orifices 300 communicating with the membrane means and inclined radially outwardly from the second rotor.

The energy recovery means 285 includes a third rotor 301 journalled for rotation about the central axis on upper and lower bearings 302 and 304 cooperating with upper and lower portions of the second rotor respectively. Gear train transmission means 306 couples the second and third rotors together so that the third rotor rotates at a third angular velocity of approximately one-half the second angular velocity of the second rotor. Thus the bearing means journal the third rotor on the second rotor to permit relative motion therebetween, with transmission means connecting the second and third rotors so as to maintain a fixed angular velocity difference therebetween. The means 285 includes impulse turbine means 308 mounted adjacent an upper portion of the third rotor and having a plurality of curved turbine vanes 310 defining passages 311 therebetween. The turbine means 308 is generally adjacent a diametrical plane containing the permeate discharge orifices 300, and thus the turbine means is exposed to the permeate discharge means and is mounted to rotate about the central axis so that the permeate fluid ejected from the nozzle means impinges on the turbine means. A portion of velocity energy in the permeate fluid fraction is recovered as torque, which, through the transmission means 306, is transferred to the second rotor to assist in rotation of the second rotor, or can be used in other applications. An annular collecting shroud 312 extends around the turbine means 308 to collect permeate fluid passing through the turbine means for collection through an exhaust duct 313, similarly to the previously described embodiments.

The impulse turbine is generally analogous to a Pelton wheel and, with suitably inclined vanes 310, velocity energy of the permeate fluid is transferred to the second rotor with relatively little energy loss provided the third rotor rotates at an angular velocity of approximately onehalf of the second rotor. Referring to FIG. 10, axes of a stream of permeate fluid ejected from the orifices 300 are drawn as a displacement diagram relative to the vanes 310 which are considered stationary, ie. position of the jet axes are shown relative to the vanes. It can be seen that a first portion 314 of the jet impinges the vanes and reflects as a second portion 315. Angles of impingement and reflection 316 and 317 respectively of the jet portions are essentially equal and thus a large portion of the velocity energy in the permeate jet is transferred to the second rotor. It must be appreciated that the permeate fluid has negligible pressure energy when ejected but can have considerable velocity energy most of which can be recovered by the impulse turbine means. The third rotor is essentially an outer, shell-like shroud substantially enclosing and spaced closely to the second rotor so as to reduce windage losses by reducing velocity differences between stationary environmental air and an outer surface of the rotating apparatus. It can be appreciated that there are increment decreases in relative velocity between the first rotor 281 and the second rotor 282, and, between the second rotor 282 and the third rotor 301.

Operation of the device follows closely that of the embodiment 94 of FIG. 3 with the exception that energy of the permeate fluid is recovered in addition, by being ejected by centrifugal action only, through the orifices 300. The velocity energy is recovered from the permeate fluid fraction by impingement on the impulse turbine of the third rotor, which fluid after impingement is collected through the collecting shroud 312.

An alternative application of the embodiment 280 is for recovery of a concentrate or reject fluid fraction of less density than that of the feed fluid as follows. This has particular application for oil/water mixture separation in which water permeates through the membranes and passes out as a permeate fraction, and due to density gradients, a lighter reject fraction containing mostly oil accumulates in the second rotor remote from the outer wall, ie. radially inwardly of the membrane means or towards the axis 283, and a heavier reject fraction accumulates outwardly of the membrane means or adjacent the wall 286, and then passes through the concentrate fluid exhaust conduit 288. For this alternative application selection of the membrane type would determine composition of the permeate, and the lighter and heavier reject fractions, but in some cases the lighter fraction might be mostly oil with a little water, the heavier fraction might be mostly water with a little oil, and the permeate fraction might be pure water.

A lighter reject fraction exhaust conduit 318 extends along the shaft 290 adjacent the central axis 283 to conduct the accumulated lighter reject fluid fraction to a lighter reject fraction orifice 320 at an upper end of the shaft. An inlet passage 319 extends across the shaft 290 as required and scoop means or other inducting means can be fitted to augment collection of less dense concentrate fluid accumulating around the shaft due to density gradients. A valve element 322 cooperates with the orifice 320 to restrict the orifice as required so as to control flow through discharge openings 324 to maintain operating pressure within the pressure vessel of the second rotor. Depressurized lighter fluid fraction is discharged into a fluid collecting duct 326 extending around the orifices and communicating with exhaust means as required.

The valve means 322 is adjusted as required and equivalent means to maintain pressure within the vessel 284 can be envisaged, and, depending upon economics and relative volumes of concentrate fluid recovered, alternative less dense reject fluid turbine energy recovery means can be substituted. The valve means 322 and equivalents thus serve as a load means cooperating with the lighter reject fraction exhaust to maintain sufficient working pressure in the feed fluid. The lighter reject fraction can be exhausted from an alternative lighter reject fraction exhaust conduit means 327, shown schematically which is disposed inwardly of the membrane means and outwardly of the axis 283 and is adapted to collect and exhaust reject fluid accumulating remotely from the walls 286 of the pressure vessel. The conduit 327 can be a plurality of perforated pipes, a perforated annular, etc. which is disposed so as to eliminate essentially pick-up of feed fluid as it leaves the diffuser means 295. If the previously described concentrate energy recovery embodiments are used to recover a reject fluid fraction lighter than the feed fluid, similar lighter reject fluid exhaust conduits can be fitted to collect lighter reject fluid fraction accumulating in a space between the membrane means and the central axis.

In the previously described embodiments, the concentrate fluid is assumed to be more dense than the feed fluid, and the second rotors are baffled for this condition. The feed fluid is injected radially inwardly from the pump diffuser means and after passing outwardly through the membrane means the resulting denser concentrate fluid fraction passes into the turbine nozzle means located at positions radially outwardly of the membrane means, in FIGS. 1, 3 and 7, or is discharged through tangentially disposed nozzles, in FIGS. 4 and 6. If, however, the concentrate fluid reject fraction includes a reject fraction which is less dense than the feed fluid, the turbine nozzle means is arranged to accept fluid from a space disposed radially inwardly of the membrane means where the less dense reject fraction will accumulate. Alternate turbine nozzle means can be provided, eg. with an intake located as shown schematically at 72.1 in FIG. 1, which intake is disposed radially inwardly of the membrane means to recover energy from the lighter concentrate fluid fraction. In such an alternative, peripherally located tangential nozzles similar to those shown in FIG. 4 and 6 can be provided adjacent the outer wall of the membrane vessel to recover energy from the heavier concentrate fraction. Thus energy can be recovered from both light and heavy reject fractions, as well as from the permeate fraction.

Figure 11:
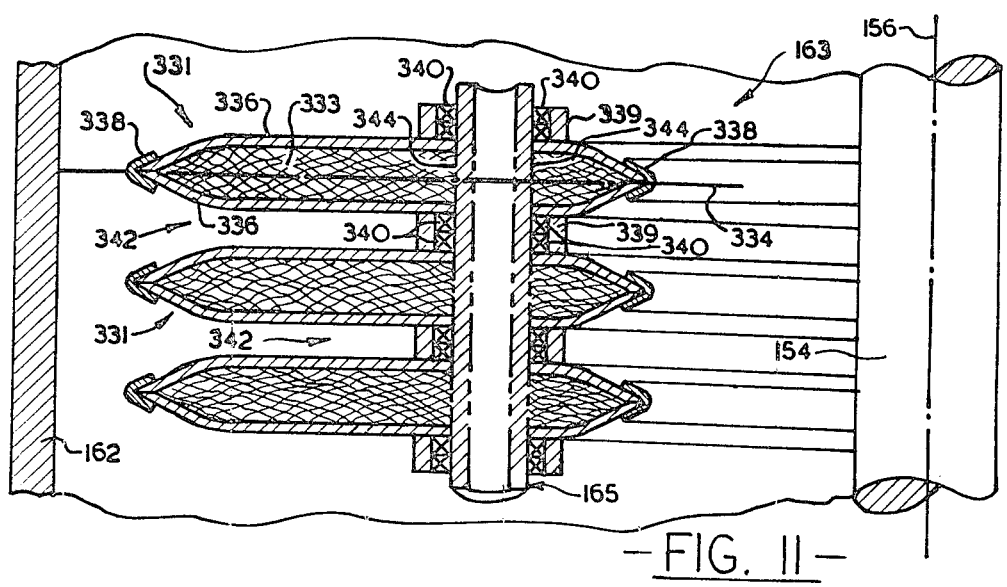
FIG. 11 is a simplified fragmented section on line 11—11 of FIG. 5 through membrane means of the invention which can also be used in other embodiments of the invention.

FIG. 11, With Reference to FIG. 5

The membrane means 163 of FIG. 5 is to be described in detail, but similar membrane means could be used in any of the embodiments in the remaining figures, and an alternative membrane means, to be described with reference to FIGS. 12 and 13, can be substituted in the FIG. 5 embodiment, or used in any of the apparatus disclosed.

The membrane means 163 includes a plurality of similar membrane elements 331, three being shown, of which an upper one is to be described in detail. The element 331 has a thin annular plate of porous sheet material 333 mounted to straddle a plane 334 normal to the central axis of rotation 156 of the rotors. A pair of similar annular semi-permeable membrane sheets 336 are attached to both sides of the thin plate and have edges thereof sealed with V-sectioned sealing means 338 to form essentially closed membrane elements. The permeate duct 165 for collection of the permeate fluid fraction from the membrane elements communicates with each membrane element through complementary openings in the elements and supports the membrane element concurrently. A plurality of spacers 339 with seals 340 enclose the duct 165 and are fitted between adjacent membrane elements to separate the membrane elements to provide feed fluid circulation channels 342 between adjacent membrane elements. The conduit means has perforations 344 communicating with the porous sheet material of the plate so as to receive permeate fluid and are aligned normally to the axis of rotation and sealed from the feed fluid channels by the seals 340. As best seen with reference to FIG. 5, the membrane elements are shown to be annular in plan with the permeate duct 165 disposed towards the axis of rotation 156, and the radially elongated spacers 164 are flow guidance means which can be arranged to ensure radial flow across faces of the membrane elements. However alternative shapes of membrane elements can be devised, and various flow control means and membrane arrays to increase surface area and to improve packing density can be substituted.

The permeate ducts 165 are disposed as close as practical to inner edges of the membrane means so that permeate fluid collecting in the porous support material is removed through the duct 165 adjacent a position of relatively low absolute pressure, that is a location on the membrane element as close as practical to the central axis 156. Thus permeate fluid is removed from the membrane elements under relatively low pressure so as to maintain a practical working pressure across the membranes. When the permeate fraction is ejected from the orifices, it has essentially only velocity energy with negligible pressure energy.

FIGS. 12 and 13

An alternative membrane means 349 can be substituted for the membrane means shown in all figures herein. The means 349 is shown within a pressure vessel 348 which rotates about an axis 350. The means 349 includes a plurality of fiber bundles 352 disposed in vertical, generally radial planes 351, extending from and supported in perforated annular support means 353 concentric with the central axis 350. The fiber bundle 352 includes a plurality of fine hollow fibers, a few of which are designated 355, the fibers being formed of a material of specific gravity greater than the feed fluid. Each fiber is formed into an elongated U-shape, that is each length is folded back on itself so as to have open ends 356 and 357 secured adjacent each other so as to form a tube sheet 358, with adjacent fibers having similar open ends disposed within a common plane 359.

A porous conduction means 361 has an outer surface 362 within the plane 359 and thus communicates with open ends of the tubes, and an inner surface 363 communicating with a permeate transfer duct 364. The duct 364 communicates with a permeate collection duct 365 in the support means for discharge as required. Thus the conduction means 361 communicates with open inner ends of each hollow fiber for conveying permeate fluid from inside the hollow fibers to collection conduit means, not shown. It can be seen that the fibers are disposed outwardly and radially from the axis of rotation 350 and are adapted to be immersed in feed fluid so that when the feed fluid is subjected to working pressure, permeate fluid is separated by the membranes and passes along the fibers inwardly through the porous conduction means into the permeate collecting duct.

The fibers are shown to be bent in a U-shape so that outer portions of the fibers are effectively closed by the fiber itself. Alternatively, straight fibers can be used with an inner end being held adjacent the porous conducting means and an opposite outer end being sealed separately. Thus a U-shaped fiber or alternative sealed outer end serves as equivalent means to prevent permeate fluid passing from the outer ends of the fibers.

I claim:

1. Apparatus for separation of feed fluid into concentrate and permeate fluid fractions by pressure applied to selective membrane means, the apparatus including first and second rotors, means to power the first rotor for rotation about a central axis at a first angular velocity, and means to recover energy from at least one of the fluid fractions when removed from the second rotor, the first rotor having impeller means to impart pressure energy and kinetic energy to the feed fluid, the second rotor having membrane pressure vessel means to contain and support the membrane means, the apparatus being further characterized by:
   (a) the second rotor having a diffuser means for the impeller means, the second rotor and the diffuser means being mounted for concurrent rotation about the central axis at a second angular velocity which is less than the first angular velocity,
so that the diffuser means converts some of the kinetic energy of the feed fluid from the impeller means into a further increment of pressure energy.

2. Apparatus as claimed in claim 1 in which:
   (a) the rotors are adapted to rotate in the same direction.

3. Apparatus as claimed in claim 1 in which:
   (a) the diffuser means of the second rotor is disposed generally radially outwardly of the impeller means of the first rotor.

4. Apparatus as claimed in claim 3 further characterized by:
   (a) the impeller means of the first rotor being a centrifugal impeller,
   (b) the diffuser means of the second rotor having a plurality of diffuser channels which expand outwardly, and communicate at inner ends thereof with the impeller means and at outer ends thereof with the pressure vessel means,
   (c) the rotors being adapted to rotate in the same direction.

5. Apparatus as claimed in claim 4 in which the means to power the first rotor includes concentrate fluid energy recovery means characterized by:
  (a) centripetal turbine runner means mounted on the first rotor adjacent the impeller means, the turbine runner means having turbine runner inlet means disposed circumferentially there-around and generally adjacent but spaced axially from impeller discharge means of the centrifugal impeller, a generally diametrical plane normal to and concentric with the central axis being interposed between the runner inlet means and the impeller discharge means,
  (b) turbine nozzle means on the second rotor being disposed generally adjacent but spaced axially from diffuser inlet means of the diffuser means, and being aligned with the turbine runner means so as to accelerate concentrate fluid into the turbine runner inlet means, the diffuser inlet means and the turbine nozzle means, and the impeller discharge means and runner inlet means straddling the plane as adjacent sets of openings,
  (c) baffle means to direct the feed fluid from the diffuser means to the membrane means thence to the turbine runner means,
  (d) means to reduce recirculation of fluid across the diametrical plane.

6. Apparatus as claimed in claim 5 further characterized by:
  (a) the centrifugal impeller of the first rotor having an inlet duct concentric with the central axis to conduct feed fluid into the centrifugal impeller,
  (b) the second rotor having an annular conduit means connected thereto and surrounding a portion of the inlet duct of the centrifugal impeller, the annular conduit means receiving concentrate fluid from the turbine runner means,
  (c) the means to reduce recirculation across the diametrical plane being a generally annular shroud disposed between the turbine nozzle means and the diffuser inlet means, and between the turbine runner inlet means and the impeller discharge means, the shroud directing oppositely flowing fluid between the impeller means and diffuser means, and between the turbine nozzle means and the turbine runner means to reduce fluid recirculation therebetween.

7. An apparatus as claimed in claim 6 further characterized by:
  (a) the turbine means being an impulse turbine,
  (b) a third rotor journalled for rotation about a central axis and carrying the turbine means, the third rotor cooperating with the second rotor so as to rotate at an angular velocity of approximately one-half of the angular velocity of the second rotor, so that velocity energy of the permeate fluid is transferred to the second rotor.

8. An apparatus as claimed in claim 7 in which the third rotor is further characterized by:
  (a) bearing means journalling the third rotor on the second rotor to permit relative rotation therebetween,
  (b) transmission means connecting the second and third rotors so as to maintain a fixed angular velocity difference there-between,
  (c) the third rotor includes an outer shroud substantially enclosing and spaced closely to the second rotor so as to reduce windage losses.

9. Apparatus as claimed in claim 1 in which:
  (a) the impeller means of the first rotor is disposed generally radially outwardly of the diffuser means of the second rotor.

10. Apparatus as claimed in claim 9 further characterized by:
  (a) the impeller means of the first rotor being a rotatable chamber having an inner surface with entrainment means to induce rotary motion of the chamber into the feed fluid within the chamber,
  (b) the diffuser means of the second rotor being a conduit means having a feed fluid passage having a generally tangentially inclined inlet opening to receive the feed fluid induced to rotate within the rotatable chamber, the feed fluid passage expanding inwardly to serve as a diffuser and communicating at an inner end thereof with the pressure vessel means,
  (c) the rotors being adapted to rotate in the same direction.

11. Apparatus as claimed in claim 10 in which the means to power the first rotor includes concentrate fluid energy recovery means characterized by:
  (a) the rotatable chamber having feed fluid and concentrate fluid compartments disposed on opposite sides of a diametrical plane concentric with the central axis, the feed fluid compartment having entrainment means on the inner surface thereof, the concentrate fluid compartment having an inner surface having entrainment means to retrieve rotation energy of the concentrate fluid,
  (b) the conduit means further including a concentrate fluid discharge passage having a nozzle inclined generally tangentially to the central axis to discharge concentrate fluid into the concentrate fluid compartment, and the inlet opening of the feed fluid passage thereof communicating with the feed fluid compartment, the nozzle and the inlet opening facing in generally opposite directions for flow outwards from the nozzle and inwards into the inlet opening,
  (c) means to reduce recirculation of fluids across the diametrical plane.

12. Apparatus as claimed in claim 11 in which the means to reduce recirculation across the diametrical plane is characterized by:
  (a) an annular shroud generally coincident with the diametrical plane and positioned to separate the feed and concentrate fluid compartments.

13. Apparatus as claimed in claim 1 in which the means to recover energy from one of the fluid fractions includes:
  (a) concentrate fluid energy recovery means positioned remote from the impeller means.

14. Apparatus as claimed in claim 1 in which the means to recover energy from one of the fluid fractions includes:
  (a) concentrate fluid energy recovery means positioned adjacent the impeller means,
so that portions of the impeller means and energy recovery means are common to each other.

15. Apparatus as claimed in claim 1 in which:
  (a) the impeller means is mounted adjacent an end of the first rotor adjacent the diffuser means of the second rotor,
and the means to power the first rotor includes concentrate fluid energy recovery means characterized by:

(b) centripetal turbine runner means mounted on the first rotor adjacent an end of the first rotor remote from the impeller means, (c) turbine nozzle means mounted on the second rotor remote from the diffuser means and adjacent the turbine runner means so as to accelerate the concentrate fluid into the turbine runner means.

16. Apparatus as claimed in claim 1 including concentrate fluid energy recovery means characterized by:

(a) generally tangentially disposed nozzle means co-operating with the second rotor, the nozzle means converting pressure energy of the concentrate fluid fraction received from the membrane means into kinetic energy and being inclined to direct the concentrate fluid fraction generally tangentially in a direction opposite to direction of rotation of the second rotor, so as to assist in rotation of the second rotor.

17. An apparatus as claimed in claim 1 further including permeate fluid energy recovery means characterized by:

(a) permeate fluid discharge means communicating with the membrane means to receive permeate fluid from the membrane means, and being mounted on the second rotor to eject the permeate fluid outwards therefrom, (b) turbine means exposed to the permeate discharge means and mounted to rotate about the central axis, so that the permeate fluid fraction ejected from the nozzle means impinges on the turbine means and a portion of energy in the permeate fluid fraction is recovered as torque.

18. An apparatus as claimed in claim 1 in which the apparatus is adapted to recover a lighter reject fluid fraction of less density than the feed fluid, the apparatus being further characterized by:

(a) a lighter reject fluid exhaust conduit disposed radially inwardly of the membrane means and adapted to collect and exhaust lighter reject fluid accumulating remotely from walls of the pressure vessel, (b) load means cooperating with the lighter reject fluid exhaust conduit to maintain sufficient operating pressure in the feed fluid.

19. Apparatus as claimed in claim 18 in which:

(a) the first rotor means has the exhaust conduit, (b) the load means is a throttle valve restricting flow in the lighter reject fluid exhaust conduit.

20. Apparatus as claimed in claim 1 in which the selective membrane means include a plurality of membrane elements characterized by:

(a) thin plate of porous support material mounted in a plane normal to the central axis of the rotors, (b) semi-permeable membrane sheets attached to both sides of the thin plates and having edges thereof sealed to form membrane elements, the membrane means being further characterized by:

(c) means to support the membrane elements spaced apart to provide feed fluid circulation channels between adjacent membrane elements, (d) conduit means for collection of the permeate fluid fraction from the membrane elements, the conduit means communicating with each membrane element and communicating with the porous support material and sealed from the feed fluid channels.

21. Apparatus as claimed in claim 1 in which the selective membrane means include semi-permeable membrane means characterized by:

(a) a plurality of fine hollow fibers formed of material of specific gravity greater than the feed fluid, the hollow fibers being held in bundles, each bundle having at least one open end of each fiber secured to form a tube sheet, the fibers being disposed outwardly radially from the axis of rotation and adapted to be immersed in feed fluid, the outer ends of the hollow fibers having means to prevent permeate fluid passing there-through, (b) conduction material means communicating with the open inner end of each hollow fiber for conveying permeate fluid from inside hollow fibers to collection conduit means.

22. A method of separating a feed fluid into concentrate and permeate fluid fractions by pressure applied to selective membrane means within a pressure vessel containing the pressurized feed fluid, in which the feed fluid is pressurized by a feed pump rotating at a first angular velocity an impeller means which cooperates with a diffuser means to impart pressure energy and kinetic energy to the feed fluid, the method being characterized by:

(a) simultaneously rotating the diffuser means with the membrane means at a second angular velocity which is less than the first angular velocity.

23. A method as claimed in claim 22 further characterized by:

(a) rotating the impeller means, membrane means and the diffuser means in the same direction, so as to reduce feed pump fluid friction losses and to improve efficiency of pressure recovery in the diffuser means.

24. A method as claimed in claim 22 further characterized by:

(a) ejecting permeate fluid against permeate fluid energy recovery means to recover energy from the permeate fluid fraction.

25. A method as claimed in claim 22 further characterized by:

(a) ejecting concentrate fluid from the membrane means in such a manner to recover energy from the concentrate fluid fraction.

26. Apparatus for separation of a feed fluid into concentrate and permeate fluid fractions by pressure applied to selective membrane means, the apparatus having a membrane rotor having permeate fluid discharge means to eject permeate fluid from the membrane rotor, and concentrate fluid discharge means to remove the concentrate fluid from the membrane rotor, the apparatus being further characterized by:

(a) a turbine rotor extending around the permeate discharge means of the membrane rotor and carrying turbine means exposed to the permeate discharge means, so that the turbine rotor receives permeate fluid ejected from the membrane rotor to recover energy from the permeate fluid fraction.

27. Apparatus as claimed in claim 26 in which the turbine rotor means is further characterized by:

(a) a shroud substantially enclosing and spaced closely to the membrane rotor and journalled for rotation about the membrane rotor, the turbine rotor carrying at one end thereof impulse turbine means positioned so that permeate fluid ejected by the membrane means impinges on the turbine means so as to recover velocity energy of the permeate fluid, (b) transmission means cooperating with the rotors so that the turbine rotor rotates at an angular velocity of approximately one-half of the angular velocity of the membrane rotor, so that a portion of velocity energy from the permeate fluid is transferred to the membrane rotor.

* * * * *